No. 743,154. PATENTED NOV. 3, 1903.
W. R. EDWARDS, E. WISCH & H. N. BRENEMAN.
METALLIC PACKING.
APPLICATION FILED JUNE 1, 1903.
NO MODEL. 2 SHEETS—SHEET 1.
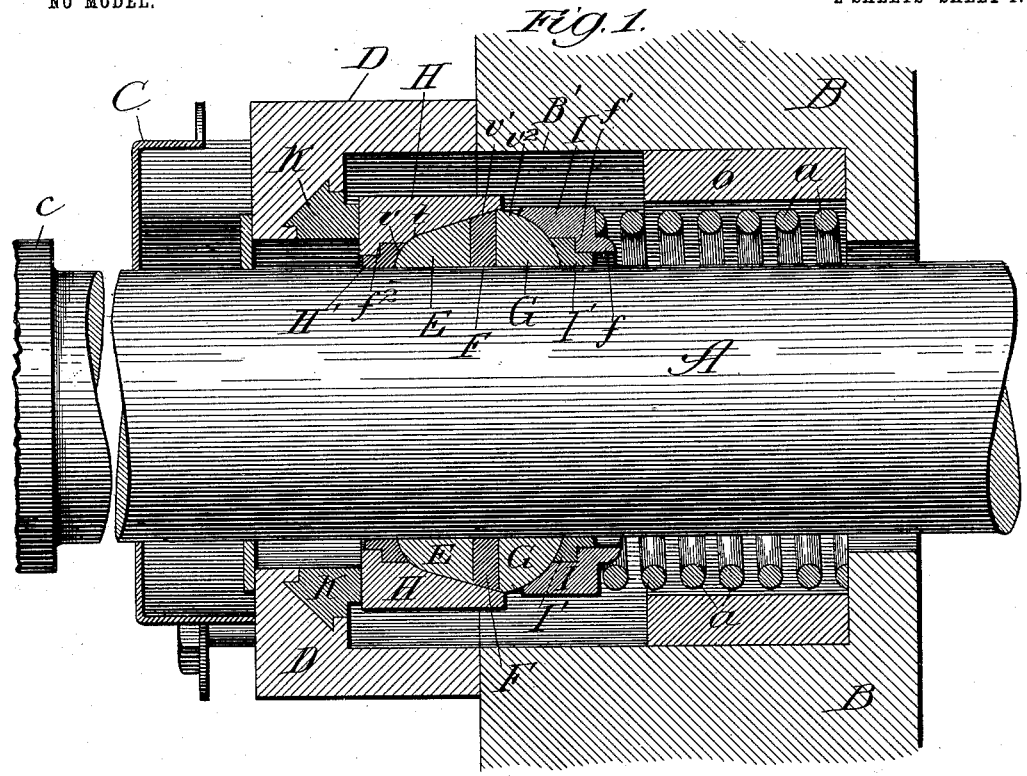
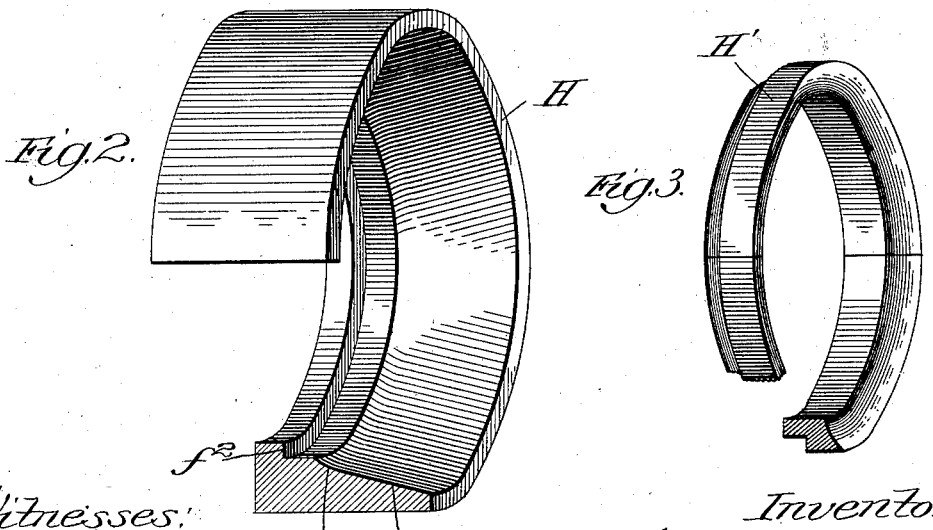
Witnesses:
Inventors:
William R. Edwards,
Ernest Wisch,
Herbert N. Breneman,
By Dyrenforth, Dyrenforth & Lee,
Attys No. 743,154. PATENTED NOV. 3, 1903.
W. R. EDWARDS, E. WISCH & H. N. BRENEMAN.
METALLIC PACKING.
APPLICATION FILED JUNE 1, 1903.
NO MODEL. 2 SHEETS—SHEET 2.
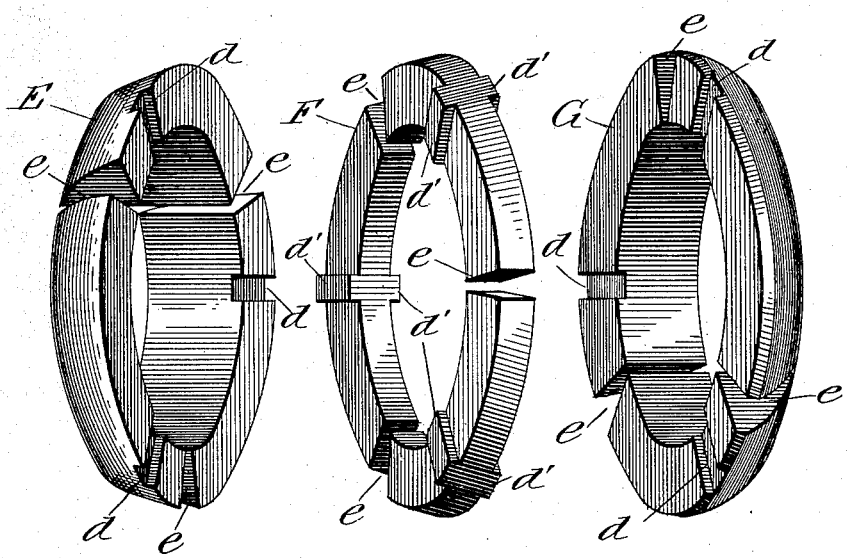
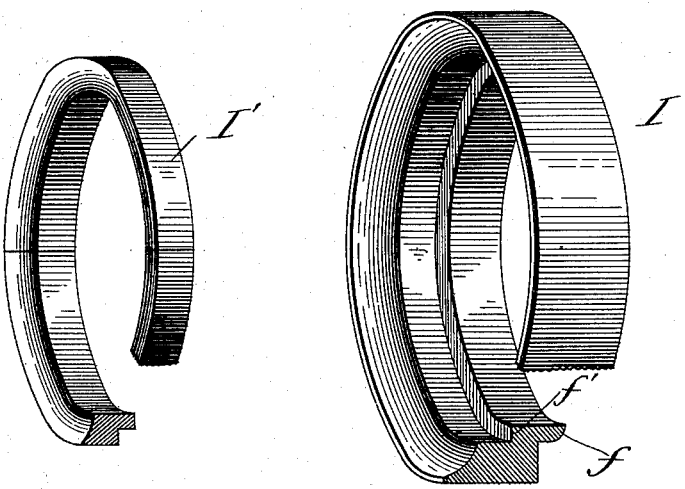
Witnesses:
Inventors:
William R. Edwards,
Ernest Wisch,
Herbert N. Breneman,
By Dyrenforth, Dyrenforth & Lee,
Attys.

No. 743,154. Patented November 3, 1903.

UNITED STATES PATENT OFFICE.

WILLIAM R. EDWARDS, ERNEST WISCH, AND HERBERT N. BRENEMAN, OF MILWAUKEE, WISCONSIN.

METALLIC PACKING.

SPECIFICATION forming part of Letters Patent No. 743,154, dated November 3, 1903.

Application filed June 1, 1903. Serial No. 159,461. (No model.)

*To all whom it may concern:*

Be it known that we, WILLIAM R. EDWARDS, ERNEST WISCH, and HERBERT N. BRENEMAN, citizens of the United States, residing at Milwaukee, in the county of Milwaukee and State of Wisconsin, have invented a new and useful Improvement in Metallic Packing, of which the following is a specification.

Our invention relates to an improvement in the class of metallic packing used for producing fluid-tight joints; and our object is to provide an improved construction of such packing for use wherever a fluid-tight joint is desired, as in connection with a piston-rod or other rod or shaft or a valve-stem, whereby the packing shall as the packing-rings or the piston-rod or other rod, shaft, or stem become worn be caused to maintain the required tightness of joint.

Our invention is illustrated in the accompanying drawings, in which—

Figure 1 is a vertical longitudinal section of our improved packing applied to a piston-rod shown broken with a portion of the head of a cylinder in which it works and the gland and swab-cup employed; Fig. 2, a broken perspective view of one of the two cup-shaped retaining-rings employed; Fig. 3, a similar view of an inner member used with the retaining-ring shown in Fig. 2 when applied to a piston-rod having an expanded outer end; Fig. 4, a similar view of the other of the two cup-shaped retaining-rings employed; Fig. 5, a similar view of the inner member used with the retaining-ring shown in Fig. 4 when applied to a piston-rod having an expanded outer end; Fig. 6, a perspective view of one of the two outer packing-rings formed of a plurality of segmental sections with spaces between the ends of the segments; Fig. 7, a like view of the other similarly-constructed outer packing-ring, and Fig. 8 a like view of the similarly-constructed intermediate packing-ring.

A denotes a piston-rod, in connection with which we have chosen to illustrate our improved metallic packing, though it will be understood that we likewise intend it for application to any other rod, shaft, or stem which is required to be rendered tight against fluid-pressure by packing.

At B is represented a cylinder-head, through which the piston-rod works, provided with a tubular housing B', containing a bushing $b$, within which a coiled spring $a$ is confined for a purpose hereinafter explained. The piston-rod shown has an expanded outer end, as represented at $c$, adjacent to which it is surrounded by a swab-cup C of any known or desired construction, and adjacent to the swab-cup the rod is surrounded by a suitable gland D, secured to the cylinder-head in the usual manner and the internal diameter of which is such as to adapt it to be passed over the expanded end of the rod.

At E, F, and G are shown the packing-rings composed of suitable packing metal, such as Babbitt metal. Each ring is formed of a plurality of arc-shaped sections or segments, preferably three in number, each segment of the outer rings E and G being provided in its inner side with a recess $d$, having parallel sides, or of V shape with the smaller end inward and each segment of the intermediate ring F being provided with lugs $d'$, projecting coincidently from its opposite sides. These rings are adjusted flatwise together about the rod A in the order represented, with the lugs $d'$ entering recesses $d$ in the segments of the outer or flanking rings. The relative positions of the lugs and recesses, the engagement of which with each other interlocks the rings to unite them, are such as to maintain the segments of each ring endwise separated to form between them a space $e$, which is lapped in break-joint manner by a segment of an adjacent ring, the spaces serving the twofold purpose of affording lubricant-holders and allowing the rings to close up about the rod as wear on them and on the rod progresses. The three rings E, F, and G form, in effect, a single packing-ring composed of three annular sections, each comprising a plurality of segmental sections spaced apart at adjacent ends. A portion of the outer surface of the ring E is shown rounded in cross-section at $v$ in Fig. 1 to describe, preferably, the parabolic curve represented. Across the remainder of this ring and the intermediate ring F and extending slightly beyond the adjacent edge of the ring G their surfaces are flattened and oblique, as shown at $v'$, to describe a line tangential to the parabola at $v$, and the cross-sectional shape of the remainder of the outer surface of the ring G is that of the arc of a circle or rounded, as shown at $v^2$. The packing-rings are held to the rod by the cup-shaped retaining-rings H and I. The inner surface of the ring H, in advance of a shoulder $f^2$ thereon, is concaved in cross-section at $t$, Fig. 1, to conform to the shape of the surface at that point of the ring E, and it extends therefrom to conform to the line $v'$ of the tangent sufficiently far over the three packing-rings to cover the two joints formed between them. The inner surface of the retaining-ring I is concaved in cross-section at its mouth to conform to the shape of the ring G, against which it bears, and the ring I is provided on its end nearest the cylinder with a tubular extension $f$, forming an internal annular shoulder $f'$. When the rod or other object to be packed has the expanded outer end referred to, each retaining-ring to pass over it for adjustment into place, must have an internal diameter greater than the diameter of such object, and under these conditions to cause the retaining-rings to fit the body thereof a suitable filling is required. Accordingly we form each retaining-ring of two concentric annular parts, employing as filling for the respective outer rings the inner rings H' and I', each formed of at least two arc-shaped sections, as represented, and fitting against the shouldered portions within the outer rings. The face of the ring H' conforms to the curve $v$ of the portion of the packing-ring E against which it bears, and the face of the ring I' conforms to the curve $v^2$ of the portion of the packing-ring G against which it bears. We prefer to form the ring H of cast-iron and the filling H' of brass. The rings I and I' may be both formed of brass or other suitable metal. The packing and retaining rings are held against the rod by the force of the spring $a$ and their abutment at the ring H against an annulus of soft metallic composition or other suitable packing K, let into a recess of suitable shape for confining it, formed in the inner corner of the gland D to project beyond its surface and bear against the outer face of the adjacent retaining-ring, thereby forming in conjunction therewith a tight steam and water joint.

The primary purpose of the described formation of the peripheries of the packing-rings is to prevent motion between them and the retaining-cups and as the packing wears to cause the circular line at the point of tangency always to form a tight steam or water joint by gradually conforming to the parabolic curve as the packing wears. By reason of the described formation the outer surface of the packing-rings wears against the correspondingly-concaved surfaces of the retaining-rings, and as the steam pressure in the chamber of the cylinder-head, aided by the spring $a$, presses against the ring I the packing-rings are forced both outward and downward, thereby tending to maintain them always tight against the gland D and tight on the rod A and allowing vibration to take place where the cast cup-shaped retaining-ring H is pressed against the soft metallic packing composition K without causing the wearing-surface of the packing-rings to leave the rod. As will be understood, constant vibration of a rod or shaft tends to wear the joint to a face and to insure a tight fit.

While the various particular details herein shown and described produce the best construction now known to us in which to embody our improvement, we do not intend to limit our invention to such details, as they may be variously modified without departure from the spirit of the invention as defined in the appended claims.

What we claim as new, and desire to secure by Letters Patent, is—

1. In a metallic packing, the combination of a series of united packing-rings having the periphery convexly curved in cross-section at its outer sides, and retaining-rings at opposite sides of said series of packing-rings concaved to conform to the curved portion of said series where they bear against the same to hold said packing-rings to the wearing-surface.

2. In a metallic packing, the combination of a series of packing-rings having the periphery convexly curved in cross-section at its outer sides, each of said rings comprising a plurality of segmental sections interlocking from one ring to another to maintain apart the sections of each ring and form spaces between the adjacent ends of said sections lapped by segments of the ring adjacent thereto, and retaining-rings at opposite sides of said series of packing-rings concaved to conform to the curved portion of said series where they bear against the same to hold said packing-rings to the wearing-surface.

3. In a metallic packing, the combination of a series of packing-rings having the periphery convexly curved in cross-section at its outer sides, each of said rings comprising at least three segmental sections with a recess in the side of each section of one or more of the rings and lugs projecting from the sides of the other ring or rings to enter said recesses and interlock the rings and maintain apart the sections of each to form spaces between their adjacent ends lapped by segments of the ring adjacent thereto, and retaining-rings at opposite sides of said series of packing-rings, concaved to conform to the curved portion of said series where they bear against the same to hold the packing-rings to the wearing-surface.

4. In a metallic packing, the combination of a series of united packing-rings having the periphery convexly curved in cross-section at its outer sides and the portion of the periphery between said curved sides forming, in cross-section, a line extending across the joints between the several rings in said series, tangential to the parabola described by the curve at one said outer side, a packing-ring at one side of said series conforming to the parabolic curve and tangential line extending therefrom on the portion of said periphery against which it bears, and a retaining-ring conforming to the opposite curved portion of said periphery against which it bears.

5. In a metallic packing, the combination with a series of interlocking sectional packing-rings forming spaces between the sections, and retaining-rings at opposite sides of said series for holding said packing-rings to the wearing-surface, of a gland containing a soft metallic composition packing bearing against the outer retaining-ring.

6. In a metallic packing, the combination with a series of interlocking sectional packing-rings forming spaces between the sections, of retaining-rings at opposite sides of said series for holding said packing-rings to the wearing-surface, each said retaining-ring comprising an outer ring and an inner sectional ring seating within said outer ring.

7. A metallic packing comprising, in combination with a rod, or the like, and a gland thereon, a series of interlocking sectional packing-rings forming spaces between the sections, the periphery of said series being convexly curved in cross-section at its outer sides and the intermediate portion of the periphery between said curved sides forming, in cross-section, a line, extending across the joints between the several rings in said series, tangential to the parabola described by the curve at one said outer side, a packing-ring at one side of said series conforming to the parabolic curve and tangential line extending therefrom on the portion of said periphery against which it bears, a retaining-ring conforming to the opposite curved portion of said periphery against which it bears, a soft metallic composition packing in said gland bearing against the outer retaining-ring, and a spring confined against the series of packing-rings and their retaining-rings.

WILLIAM R. EDWARDS.
ERNEST WISCH.
HERBERT N. BRENEMAN.

In presence of—
EVERETT C. HART,
FRANK P. BROCK.